(12) United States Patent
Graff

(10) Patent No.: US 6,178,657 B1
(45) Date of Patent: Jan. 30, 2001

(54) APPARATUS AND METHOD FOR MEASURING THE RELATIVE DIFFERENTIAL LENGTH IN A SHEET OF MATERIAL

(75) Inventor: Ernest A. Graff, Ontario, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/224,386

(22) Filed: Dec. 31, 1998

(51) Int. Cl.[7] ................................. G01B 7/02; G01B 5/02
(52) U.S. Cl. ...................... 33/732; 33/1 BB; 33/501.02; 33/712; 33/DIG. 2
(58) Field of Search .................. 33/733, 1 BB, 33/700, 701, 712, 732, 501.02, 501.03, 533, 548, 549, 551, 552, 553, 554, DIG. 2; 73/159, 865.8; 702/155, 158, 159, 170, 171

(56) References Cited

U.S. PATENT DOCUMENTS

| | | | |
|---|---|---|---|
| 3,528,002 | * 9/1970 | Dunlavey | 33/501.03 |
| 3,703,097 | * 11/1972 | Kilpatrich et al. | 33/501.03 |
| 3,974,248 | * 8/1976 | Atkinson | 73/159 |
| 5,575,075 | * 11/1996 | Sasaki | 33/501.02 |

* cited by examiner

Primary Examiner—Christopher W. Fulton
(74) Attorney, Agent, or Firm—Susan L. Parulski

(57) ABSTRACT

An apparatus for measuring the relative differential length of a sample of a web or sheet material. The apparatus includes a substantially flat surface adapted to support the sample. Air is removed between the sample and the substantially flat surface to position the sample in an unrestrained state. A translation member translates a plurality of non-contact sensors in a first direction along the length of the sample, whereby the plurality of non-contact sensors sense the distance from a reference plane to the sample and generate a signal representative of the distance sensed. A data collection system collects the generated signals and determines a relative differential length of the sample from the generated signals.

4 Claims, 12 Drawing Sheets

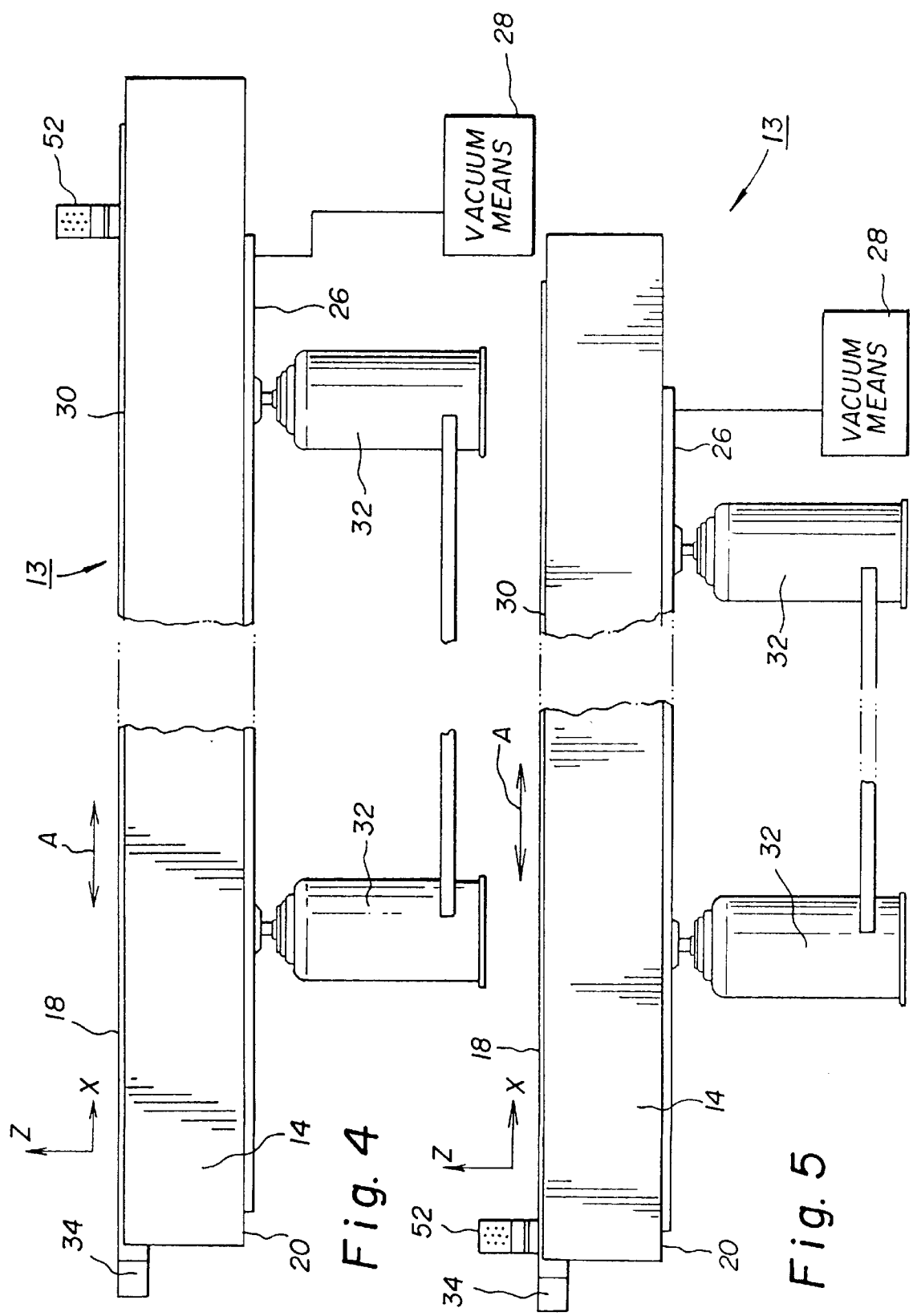

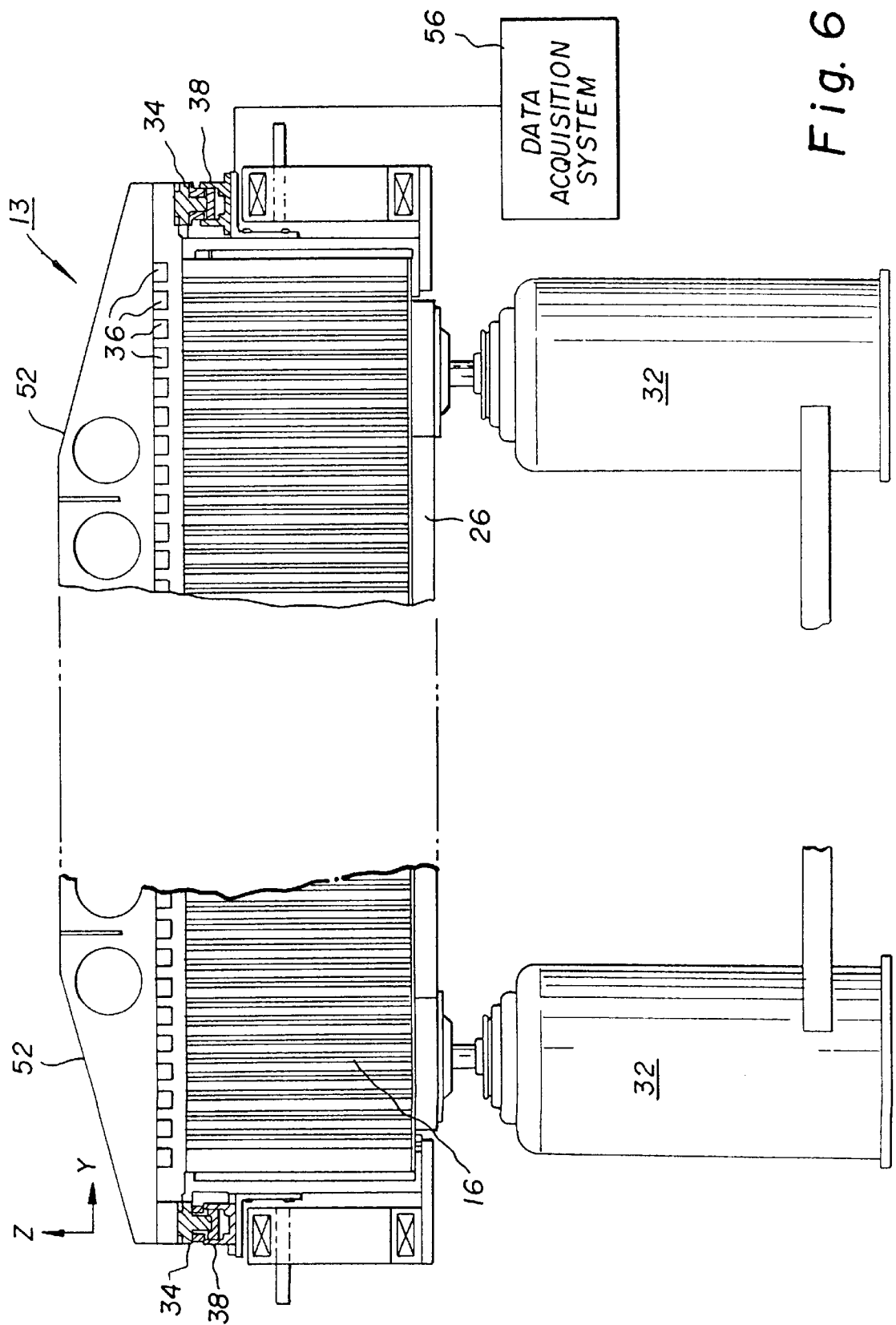

APPARATUS AND METHOD FOR MEASURING THE RELATIVE DIFFERENTIAL LENGTH IN A SHEET OF MATERIAL

FIELD OF THE INVENTION

The present invention relates generally to a method of measuring a length of a sheet of material. More particularly, the present invention is directed to a method of measuring the internal web length differences of a width of sheet material, for example, a photographic film, paper, or base support.

BACKGROUND OF THE INVENTION

During the manufacturing of web or sheet material, differential tensions can form across the width of the web or sheet material, for example, from thermal or length variations. These differential tensions cause differential strains or distortions to exist in the web or sheet material, resulting in the web or sheet material exhibiting distortions or non-planarity when positioned on a flat surface. The web or sheet material can exhibit non-flatness characteristics such as bumps, wariness at the edges, or ripples across the width. FIG. 1 shows an exaggerated view of an unflat sheet 10 exhibiting wariness at the edges and FIG. 2 shows an exaggerated view of unflat sheet 10 exhibiting bumps in a central portion of the sheet.

As mentioned above, these differential tensions can result from length variations, i.e., internal material length differences in the web or sheet material. For example, referring to FIG. 3, if sheet 10 were cut into a plurality of strips 12, any strip 12a which exhibits a non-flatness characteristic (e.g., bump, wariness, or ripple) would have a length greater than (i.e., would be longer than) a strip 12b which does not exhibit a non-flatness characteristic.

Such internal length differences may be of particular concern when the sheet is used in a particular application. For example, in the printing industry or graphics art field, a final image may be generated using several different overlays. That is, several sheets each having a portion of the final image may be separately disposed in overlapping/overlaying registration onto each other to form the final image. If one of the sheets has sufficient internal length differences, the portions (of the final image) from the separate sheets will not properly register to each other. Consequently, the a final image that is produced may be unacceptable or unusable for its intended purpose.

Several methods have been employed to determine if a sheet includes non-flatness characteristics. For example, a user may conduct a simple visual inspection of the sheet. Such a visual inspection can be conducted by laying the sheet (or the section of the web material) on a flat surface or table, and then manually counting the number of bumps or waves in a given length. Such a visual inspection is time-consuming and prone to errors. In addition, this visual inspection does not provide a method for measuring the internal length differences in a web or sheet material.

An on-line web planarity measurement apparatus may provide an indication of whether the sheet includes non-flat characteristics. Such an apparatus is disclosed in U.S. Pat. No. 5,678,447 (Graff), commonly assigned and incorporated herein by reference. As noted above, the planarity of the web or sheet material is related to internal length differences. However, this reference does not provide a method for measuring the internal length differences in a web or sheet material.

In another method, the sheet is cut into individual strips, and then each strip length is measured. Such a method is accomplished by laying a section of the web material on a flat surface or table and then cutting a sheet from the web material. The resulting sheet has a uniform length across its width such that, as shown in FIG. 3, if the sheet is measured in it's full width form, the length X of the sheet is the same at every position Y across the sheet. The resulting sheet is then cut/slit into plurality of strips 12. Each strip is then disposed within a mechanical apparatus to measure it's length. Such a method is time-consuming and prone to errors. In addition, many mechanical apparatus do not have the resolution required to measure the minute differential lengths necessary for Applicant's application, which are in the range of microinches. For example, if a raised area of the sheet has a dimension 0.005 inches from the flat surface with the length of the raised area being 3 inches in length in the direction of the measurement (i.e., in the X direction; the direction of the cut/slit), the additional length of material in the sheet is about 0.000023 inches (23 microinches).

Accordingly, while each of these methods may have achieved certain degrees of success in their particular applications, a need continues to exist for an apparatus and method for measuring the relative differential length of a web or sheet material. The apparatus should be suitable for measuring minute differential lengths, and the method should not be time-consuming or prone to errors. In addition, the method should not adversely affect the web or sheet material whose differential length is being measured.

SUMMARY OF THE INVENTION

An object of the present invention is to provide an apparatus and method for measuring the relative differential length of a web or sheet material.

Another object of the present invention is to provide such an apparatus and method which is not time-consuming or prone to errors.

Still another object of the present invention is to provide such an apparatus and method which provides a high degree of resolution and accuracy.

Still a further object of the present invention is to provide such an apparatus and method which provides objective measurements with minimal operator handling and with minimal operator training.

Yet another object of the present invention is to provide such an apparatus and method which is suitable for use with photosensitive web material, including un-coated photographic base support material.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an apparatus for measuring the relative differential length of a sample of a web or sheet material, the sample having a top surface and a bottom surface. The apparatus comprises a substantially flat surface adapted to support the sample and an air exhausting means for removing air disposed between the sample and the substantially flat surface to dispose the sample in an unrestrained state. A plurality of non-contact sensors are adapted to sense the distance from a reference plane to the sample and generate a signal representative of the distance sensed. A translation member translates the plurality of non-contact sensors in a first direction along the length of the sample. A data collection system collects the generated signals and determines a relative differential length of the sample from the generated signals.

According to another aspect of the present invention, there is provided a method for measuring the relative differential length of a sample of a web or sheet material, the sample having a top surface and a bottom surface. The method comprising the steps of stationarily positioning the sample on a substantially flat surface such that the bottom surface of the sample is adjacent the substantially flat surface; removing air disposed between the bottom surface of the sample and the substantially flat surface such that the sample is in an unrestrained state; translating a plurality of non-contact sensors in a first direction along the length of the sample; sensing the distance from a reference plane to the top surface of the sample; generating a plurality of signals which are representative of the distance sensed; and determining a length from the generated signals, the length corresponding to the relative differential length of the sample.

The present invention provides an apparatus and method for measuring the relative differential length of a web or sheet material. The apparatus provides a high degree of resolution and accuracy, and the method is not time-consuming or prone to errors. Further, the apparatus and method provide for objective measurements with minimal operator handling and with minimal operator training. In addition, the apparatus and method are suitable for use with photosensitive web material, including un-coated photographic base support material.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 4 shows a side view of an apparatus for measuring the relative differential length of a web or sheet material in accordance with the present invention.

FIG. 5 shows a side view of the apparatus of FIG. 4.

FIG. 6 shows an end view of the apparatus of FIG. 4.

FIG. 14b shows the tabular data corresponding to the plot of FIG. 14a.

FIG. 15a shows a plot of a measurement taken using the apparatus of FIG. 4.

FIG. 15b shows the tabular data corresponding to the plot of FIG. 15a.

FIG. 16b shows the tabular data corresponding to the plot of FIG. 16a.

DETAILED DESCRIPTION OF THE INVENTION

Figure 1:
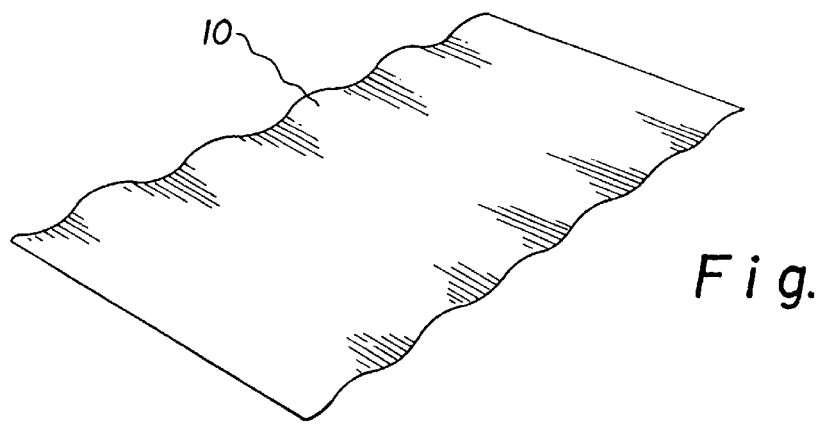
FIG. 1 shows an exaggerated perspective view of an unflat sheet exhibiting wariness at the edges.
Figure 2:
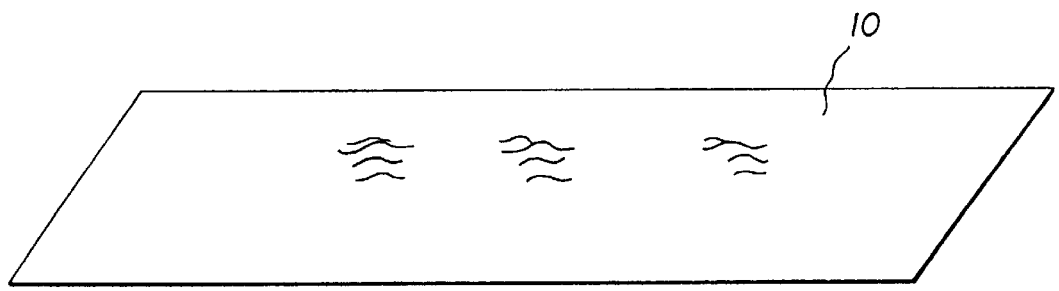
FIG. 2 shows an exaggerated perspective view of an unflat sheet exhibiting bumps in the central portion of the sheet.
Figure 3:
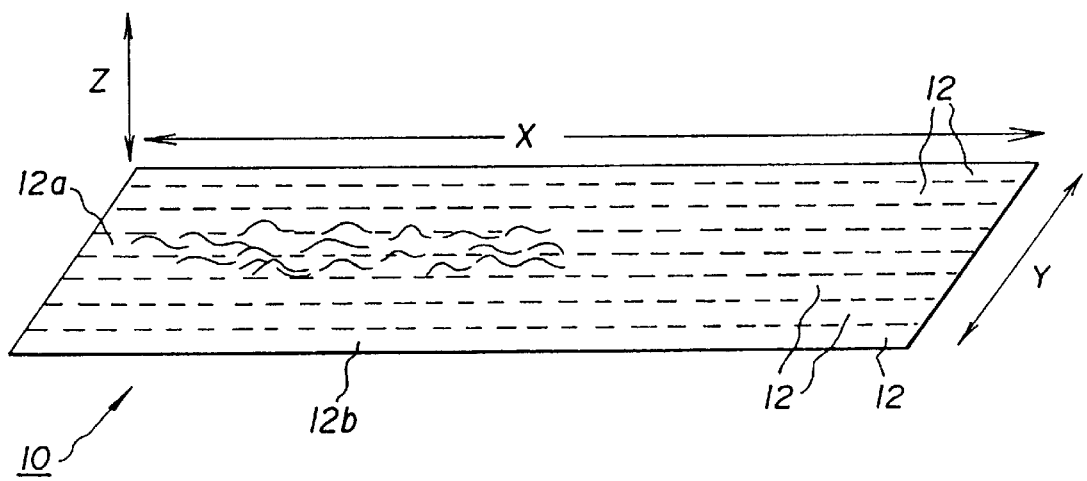
FIG. 3 shows an exaggerated perspective view of a sheet having flat portions and non-flat portions.

The following is a detailed description of the preferred embodiments of the invention, reference being made to the drawings in which the same reference numerals identify the same elements of structure in each of the several figures.

Figure 8:
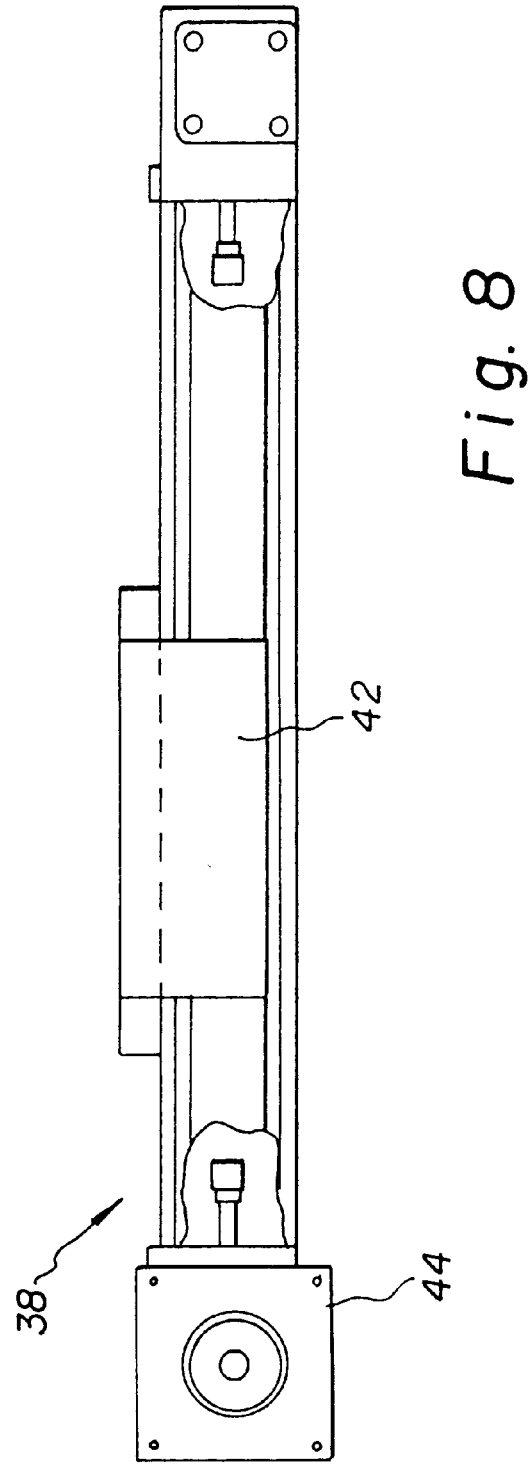
FIG. 8 shows a side view of the linear slide of FIG. 7.
Figure 9:
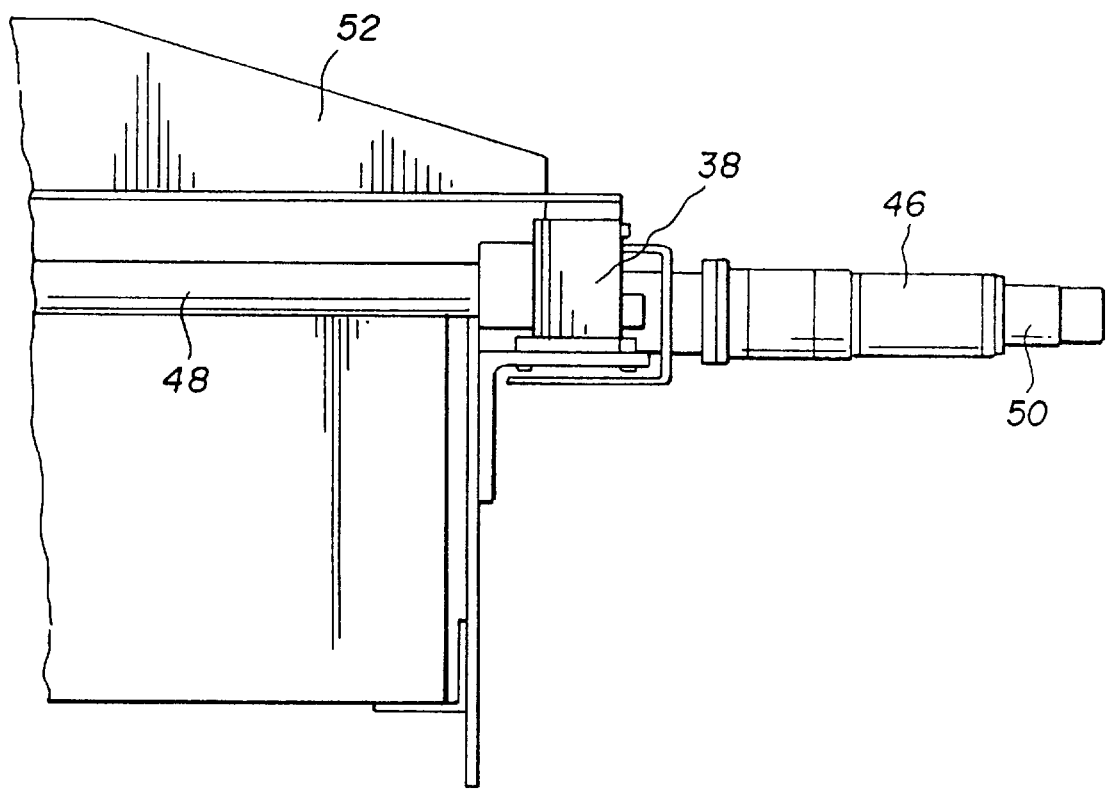
FIG. 9 shows a portion of the apparatus of FIG. 4 showing the linear slides, motor, and encoder.
Figure 10:
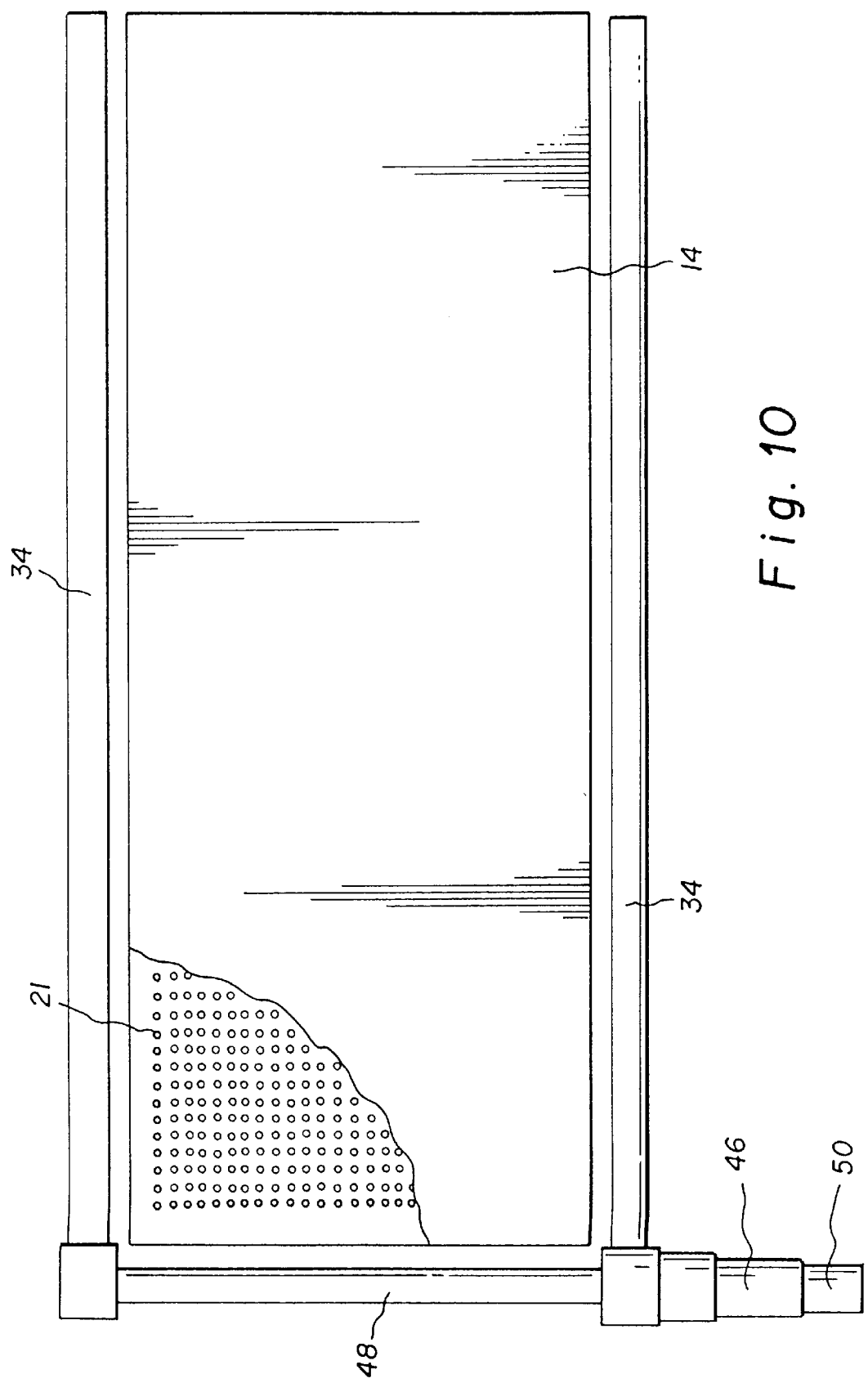
FIG. 10 shows a top view of a portion of the apparatus of FIG. 4 illustrating the flat table, linear slides, common drive shaft, motor, and encoder.

RetelTing to FIGS. 4–12, there is shown an apparatus 13 for measuring the relative differential length of a web or sheet material in accordance with the present invention. As best shown in FIGS. 4–6, apparatus 13 includes a substantially flat surface having a dimension sufficient in length and width to support the web or sheet material being measured without the web or sheet material extending beyond edges of the flat surface. The substantially flat surface is shown in the figures as an optically flat table 14. such as Model No. RPR-512-12 available from Newport. Such a flat table includes a honey-comb inner structure 16 having a stainless steel top plate 18 and bottom plate 20. Top plate 18 includes a plurality of openings. In Applicant's particular apparatus, the openings in top plate 18 have a 3/32 inch hole pattern on 1 inch centers. A portion of the openings are illustrated in FIG. 10 as openings 21. Similarly, bottom plate 20 includes a plurality of openings, with Applicant's particular apparatus having a ¼ inch –20 hole pattern. The openings in the top and bottom plates are arranged such that air (or other suitable gas) may flow from top plate 18 and through the openings and honey-comb inner structure 16.

Mounted to bottom plate 20 is a duct 26 in fluid communication with the openings in bottom plate 20 and a vacuum means 28. Such fluid communication provides any air pressure or vacuum applied through duct 26 to the openings in bottom plate 20. Accordingly, a negative air pressure (i.e., vacuum) applied to duct 26 is correspondingly applied to the sheet being measured so as to securely position the sheet on an exterior surface 30 of top plate 18. Similarly, a positive air pressure applied by vacuum means 28 to duct 26 is correspondingly applied to the sheet being measured so as to space (i.e., float) the sheet from surface 30. Such a positive air pressure may be desired to move the sheet relative to surface 30 for positioning. Note that when duct 26 is vented to atmosphere, any air that is trapped between the sheet and surface 30 is vented through the openings in top plate 18, whereby the sheet is supported on surface 30 in a natural, relaxed, unrestrained state. As such, duct 26 provides a means for exhausting air trapped under the sheet. As will become more apparent, this natural, unrestrained state will be employed to obtain a measurement of the relative differential length.

Flat table 14 and duct 26 are preferably disposed on an isolation member 32 to minimize external vibrations which could adversely affect the measurements in accordance with the present invention. Isolation member 32 is shown in FIGS. 4–6 as a pair of vibration isolators from Newport, Model No. I-2000-423.t-TC.

The apparatus of the present invention further includes a translation member 34 adapted to transport a plurality of ultrasonic sensors 36 along the length of the sheet in a direction shown by the arrow A in FIGS. 4 and 5. As illustrated, the ultrasonic sensors are spatially disposed from the web or sheet material. Translation member 34 is shown in FIGS. 4–6 as comprising a pair of linear slides 38 mounted on opposing sides of flat table 14. Linear slides 38 are arranged substantially parallel to side edges of flat table 14 and substantially parallel to surface 30 on which the sheet is positioned for measurement.

Figure 7:
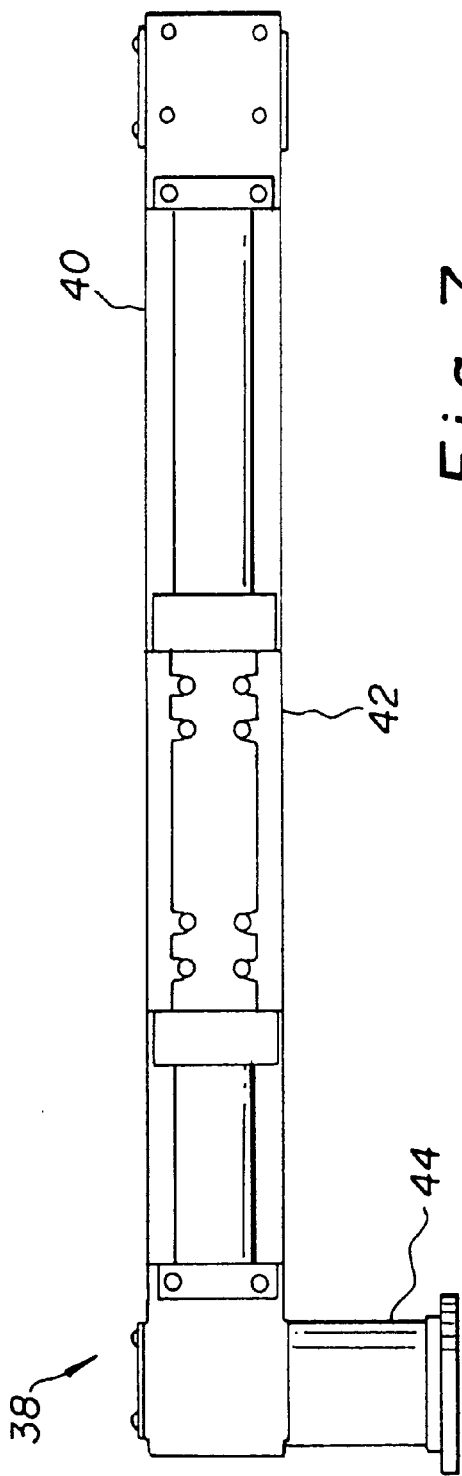
FIG. 7 shows a top view of a linear slide suitable for use in the apparatus of the present invention.

Linear slides 38 suitable for Applicant's application are Model No. HLE60SR series linear slides from Parker Automation, shown in FIGS. 7 and 8. As shown, each linear slide 38 includes a housing 40, a carriage assembly 42 which translates along an internal linear bearing (not shown), and an internal belt mechanism (not shown) for moving carriage assembly 42 in a controlled manner along the length of the linear slide. Linear slide 38 further includes an external motor housing 44 providing a connection between linear slide 38 (via the internal belt mechanism) and an electrical drive motor 46, as particularly shown in FIGS. 9 and 10. The pair of linear slides 38 are driven by a common drive shaft 48 by motor 46, such as a commercially available stepper motor. Common drive shaft 48 ensures that both carriage assemblies 42 translate simultaneously. Note that the linear slides preferably provide minimal translation in the Z-direction, as shown in FIGS. 4–6, as the carriage assembly traverses the length of the linear slide and flat table.

As particularly shown in FIGS. 9 and 10, an encoder 50 is mounted on a drive shaft of motor 46. Encoder 50 provides a particular number of pulses for every revolution of encoder 50 and motor 46. Accordingly, the position of carriage assembly 42 can be determined by the linear movement of linear slides 38 per revolution of motor 46.

A support member 52, illustrated in FIGS. 4–6 and 9 as a gantry, is disposed across the width of flat table 14 and mounted on linear slides 38. By this mounting, when motor 46 translates linear slides 38, support member 52 traverses the length of flat table 14 in a direction parallel to surface 30. Accordingly, encoder 50 provides a signal proportional to the position of support member 52.

Figure 11:
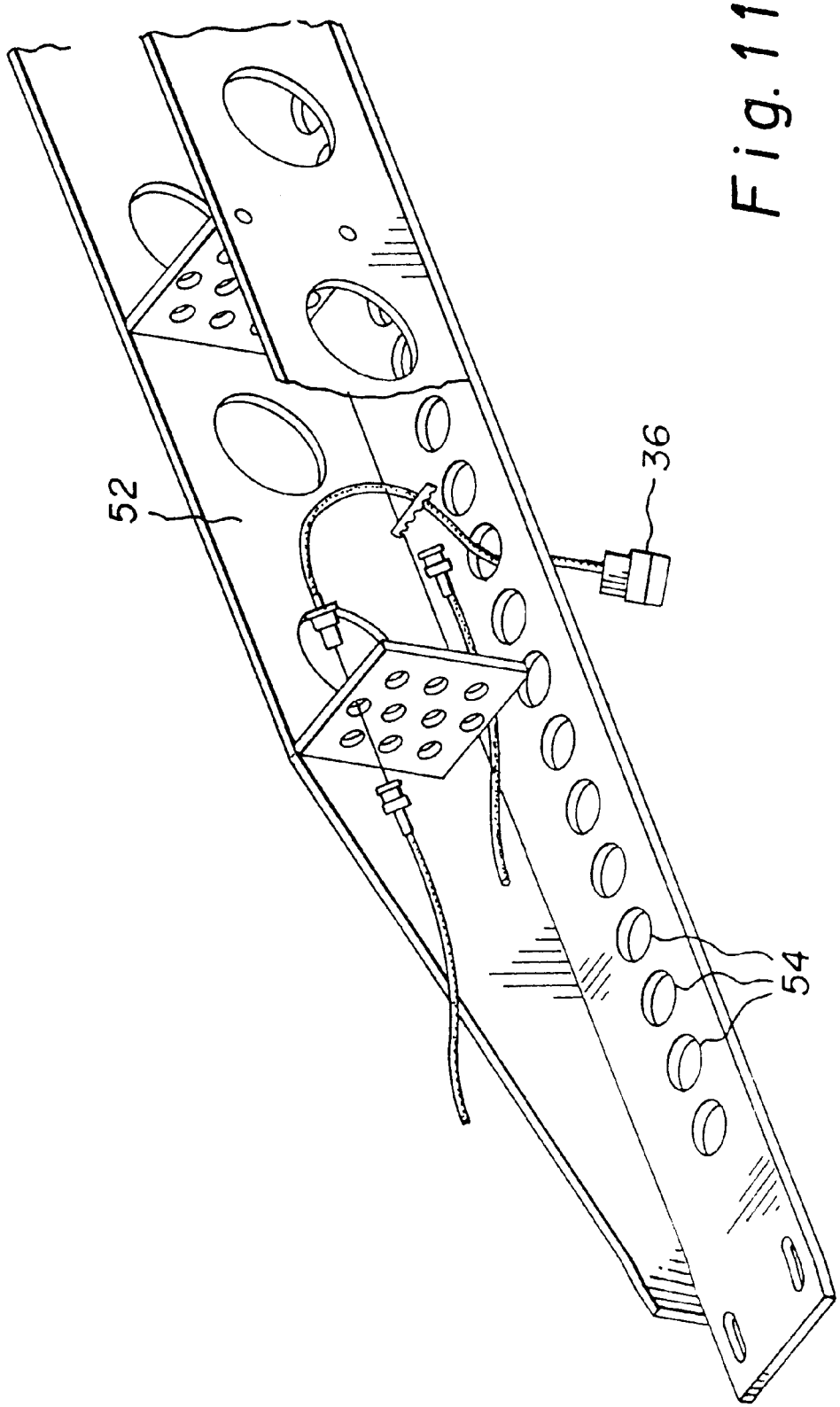
FIG. 11 shows a partial exploded view of the support member.

Plurality of ultrasonic sensors 36 are mounted on support member 52, as best illustrated in FIG. 6. As best illustrated in FIG. 11, support member 52 includes a plurality of mounting holes 54 for mounting ultrasonic sensors 36. Each ultrasonic sensor 36 is mounted within mounting holes 54 so as to be directed toward the sheet disposed on surface 30 of flat table 14 and normal to surface 30. Ultrasonic sensors 36 suitable for Applicant's apparatus are PULSONIC non-contact system sensors by Cleveland Motion Control. Such an ultrasonic sensor is suitable for use with sheet material which is transparent. The ultrasonic sensors emit a pulse of a high frequency sound which is reflected of the sheet material and transmitted back to the sensor. The electronic unit of the sensor generates a voltage signal proportional to the time required by the pulse to be transmitted back to the sensor. Accordingly, as the spacing between the sheet material and the ultrasonic sensor is reduced, the time required for the pulse to transmitted back to the sensor will decrease as will the corresponding voltage signal.

Figure 12:
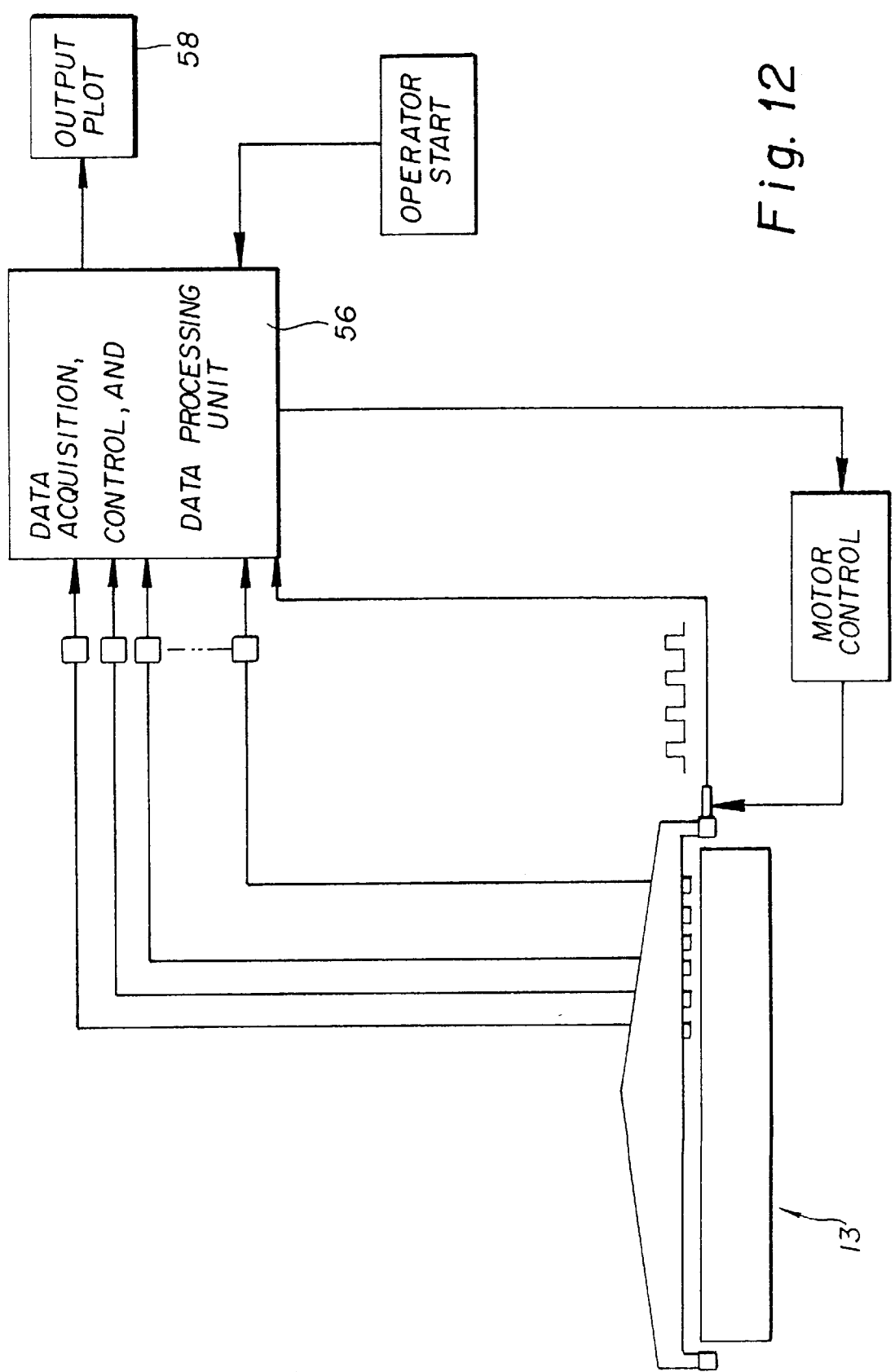
FIG. 12 shows a schematic illustration of the apparatus of the present invention.

A data acquisition system 56, shown in FIGS. 6 and 12, controls the movement of support member 52, receives the voltage signal from the ultrasonic sensors, converts the voltage signal to an engineering distance, calculates an internal length difference (as will be further described below), and provides for an optional display signal to a display device 58.

RefelTing again to FIGS. 4–12, in operation, the web or sheet material to be measured is disposed on surface 30 of substantially flat table 14. An operator then applies a vacuum to duct 26 to secure the web or sheet material to flat table 14. The operator then trims one or more edges of the web or sheet material using an edge of flat table 14 as a guide to define a sample for measurement. Each time a trim is made, vacuum secures the sample to the flat table. This trimming provides a square edge of the web or support material. Once trimmed, the operator removes the vacuum and moves the sample to a predetermined area on the flat table for scanning. When scanned, the sample is in the natural, unrestrained state. The data acquisition system is initiated, and support member 52 traverses flat table 14 in the X-direction. Accordingly, plurality of ultrasonic sensors 36 traverse the length of flat table 14 and the web or sheet material and a plurality of measurements are taken. As such, the ultrasonic sensors sense the distance from a reference plane to the sample. For example, measurements from each ultrasonic sensor are preferably taken every 0.01 inch of travel of support member 52. These sensors use an acoustic time of movement to measure the distance from a target to the sensor. Thus, as the sensor any raised portion of the web (i.e., bumps, ripples), there will be a proportional change in the output voltage of the sensor. The voltage changes are then converted to distance changes or height of the web or sheet material.

If X is defined as the distance the sensor travels along the sheet and Z is defined as the height of the measurement (i.e., the raised portion), the length of the sheet is determined by calculating the length of the web for each $\Delta X$ measurement, and summing the results for the length of the measurement. That is, the length of the web for each $\Delta X$ measurement is equal to the square root of ($\Delta^2$ plus $\Delta Z^2$), and the total length L is equal to the sum of the length measurements. That is:

$$L = \sum_{1}^{i=n} \sqrt{((X_i - X_{i-1})^2 + (Z_i - Z_{i-1})^2)} \qquad \text{Equation 1}$$

Figure 13:
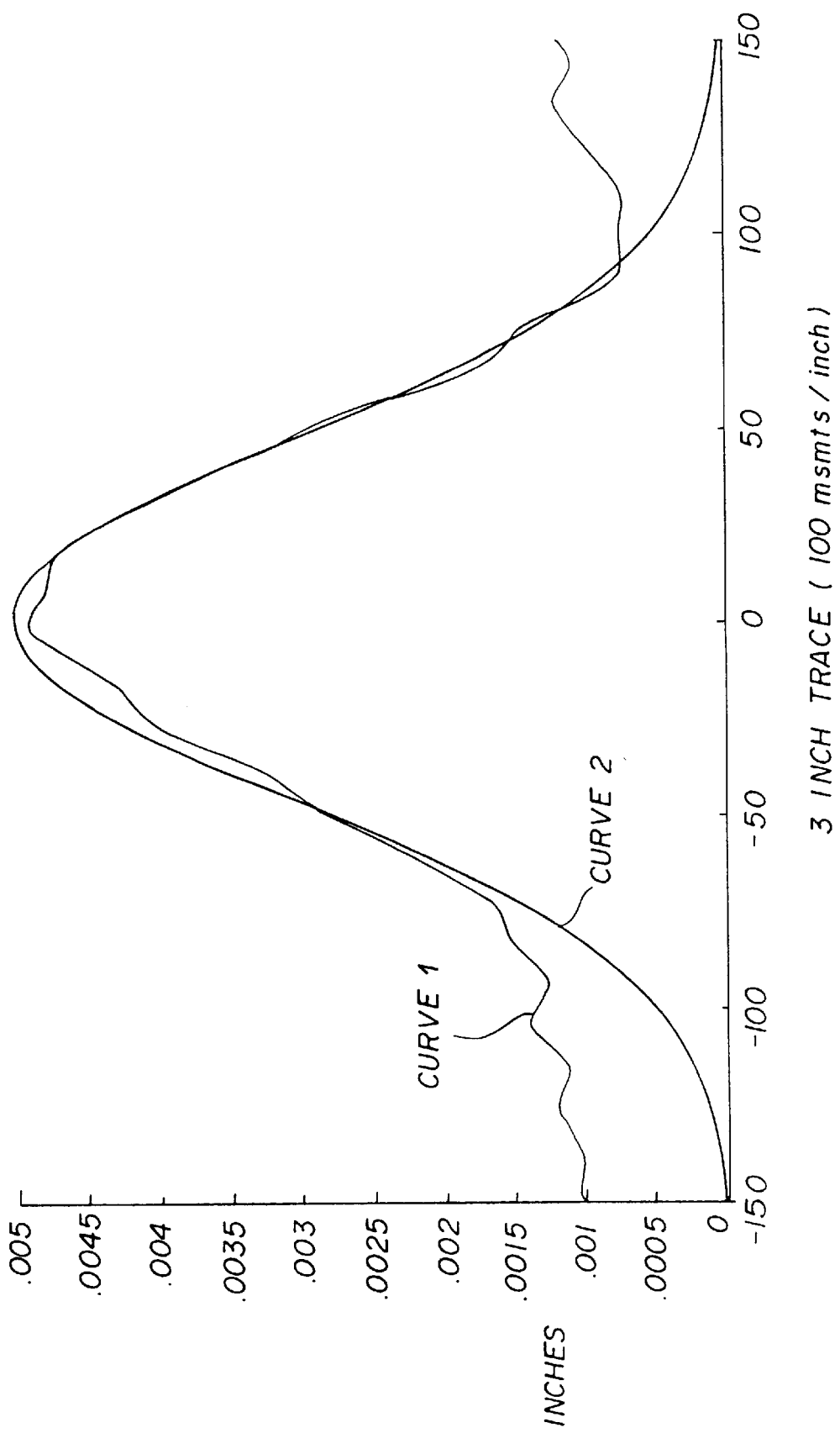
FIG. 13 shows a pair of curves illustrating the measurement method according to the present invention.

Applicant's experiments have confirmed the apparatus and method the present invention. FIG. 13 shows a first curve (Curve 1) showing a portion of a measurement obtained from an ultrasonic sensor as it traversed a raised portion of a sheet. Curve 2 of FIG. 13 was derived from the following equation:

$$\text{Inches} = 0.005 e^{-(0.15x)2} \qquad \text{Equation 2}$$

The actual length of Curve 2 based on the length equation, as found in a typical Calculus text book is:

$$\text{Length} = \int_0^x \sqrt{1 + (Xd/d_x)^2} \qquad \text{Equation 3}$$

Substituting Equation 2 into Equation 3 for X and solving using a commercially available numerical data processing program, such as Derive from "Soft Warehouse", and resolving to 14 digits of accuracy, produces a result of 3.00002349 inches. Using Equation 1 to resolve the length of Curve 2 produces a result of 3.00002349 inches. Thus, the method stated in Equation 1 is a valid method to determine the length of the curve derived from Equation 2. From FIG. 13, one can observe that Curve 1 is similar to Curve 2 and that the length of Curve 1 is approximately the same as the length of Curve 2. The calculated length of measured Curve 1, using Equation 1, is 3.00002176 inches. The precision or repeatability of the measurement is demonstrated by FIGS. 14–16, which are repeat traces of a web sample.

Figure 14A:
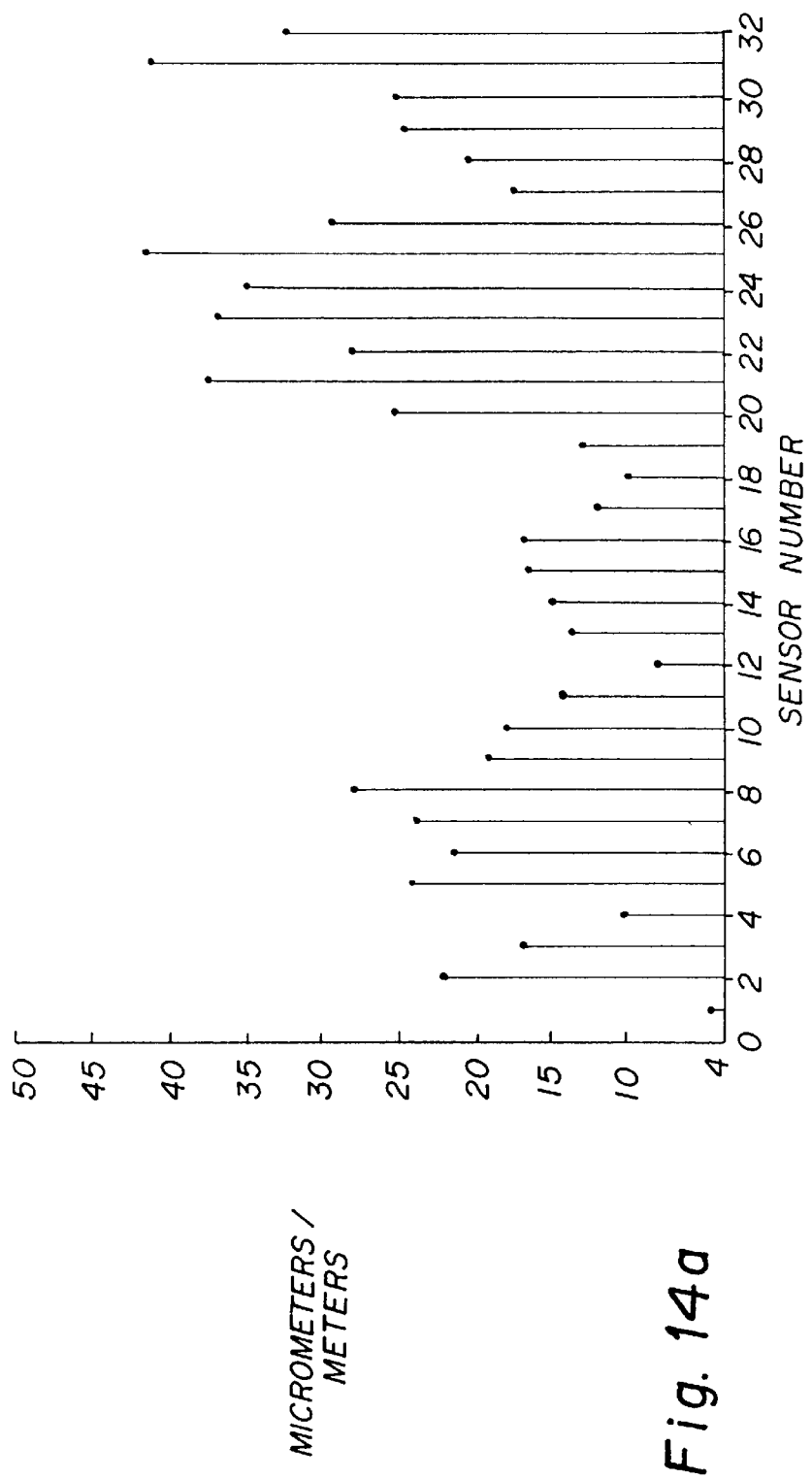
FIG. 14a shows a plot of a measurement taken using the apparatus of FIG. 4.
Figure 14B:
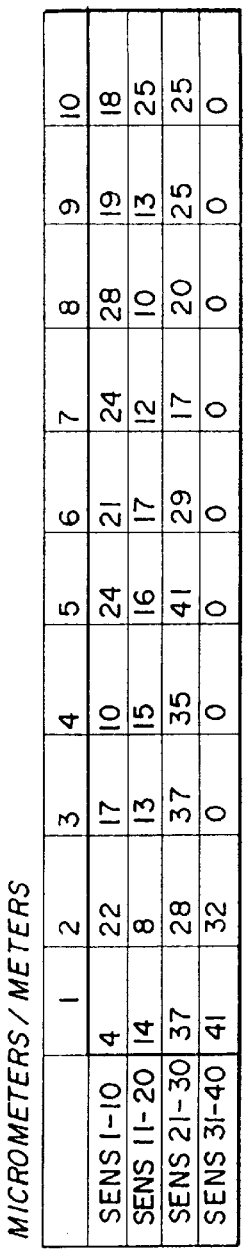
Figures 15A, 15B:
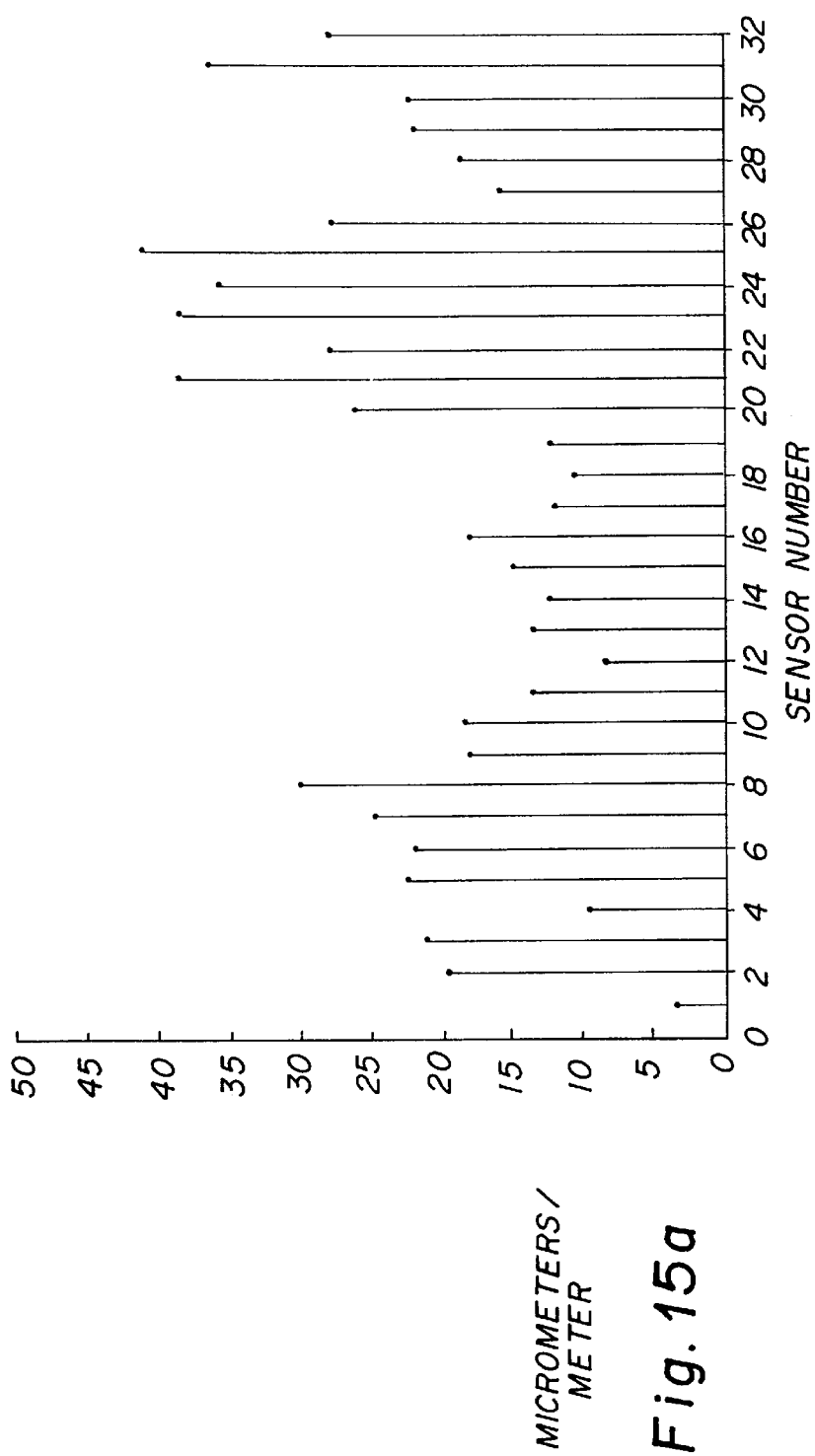
Figure 16A:
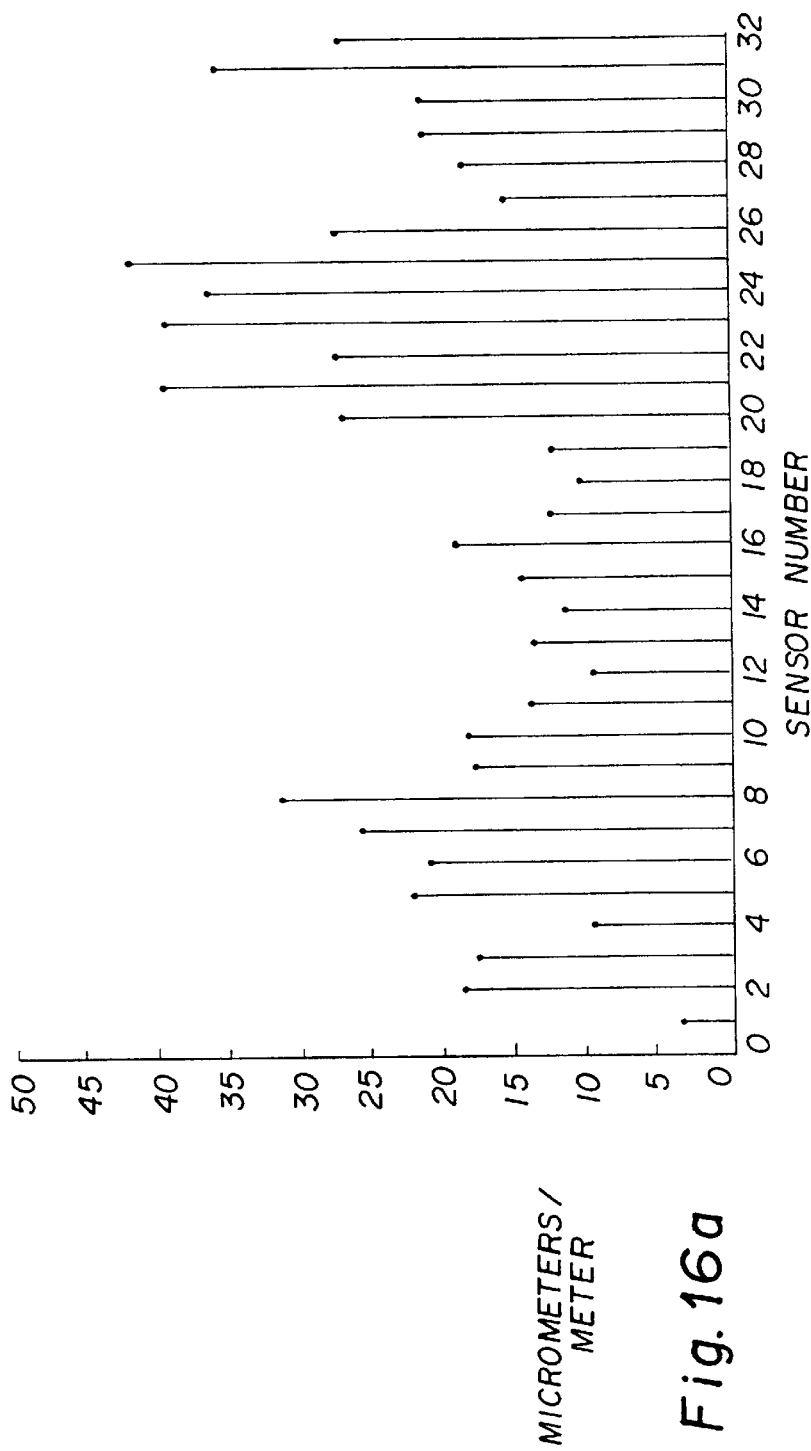
FIG. 16a shows a plot of a measurement taken using the apparatus of FIG. 4.
Figure 16B:
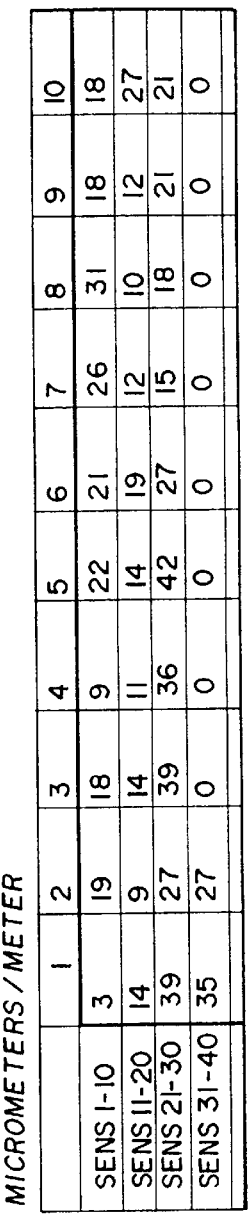

Accordingly, when the scan is completed, the data acquisition system will calculate the individual web length differences as indicated by Equation 1 and produce output data such as shown in FIGS. 14–16. When known limits for internal length differences, the data acquisition system can signal an operator of a manufacturing problem.

The invention has been described in detail with particular reference to a presently preferred embodiment, but it will be understood that valiations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST | |
|---|---|
| 10 | sheet |
| 12 | strips |
| 13 | apparatus in accordance with the present invention |
| 14 | flat table |
| 16 | honey-comb inner structure |
| 18 | top plate |
| 20 | bottom plate |
| 21 | openings in top plate |
| 26 | duct |
| 28 | vacuum means |
| 30 | surface of top plate |
| 32 | isolation members |
| 34 | translation member |
| 36 | ultrasonic sensors |
| 38 | linear slides |
| 40 | housing |
| 42 | carriage assembly |
| 44 | motor housing |
| 46 | motor |
| 48 | drive shaft |
| 50 | encoder |
| 52 | support member; gantry |
| 54 | mounting holes |
| 56 | data acquisition system |
| 58 | display device |

What is claimed is:

1. A method for measuring the relative differential length of a sample of a web or sheet material, the sample having a top surface and a bottom surface, the method comprising the steps of:

stationarily positioning the sample on a substantially flat surface such that the bottom surface of the sample is adjacent the substantially flat surface;

removing air disposed between the bottom surface of the sample and the substantially flat surface such that the sample is in an unrestrained state;

translating a plurality of non-contact sensors in a first direction along the length of the sample;

sensing the distance from a reference plane to the top surface of the sample;

generating a plurality of signals which are representative of the distance sensed; and determining a length from the generated signals, the length corresponding to the relative differential length of the sample.

2. The method according to claim 1 wherein the length is determined using the equation:

$$L = \sum_{1}^{i=n} \sqrt{((X_i - X_{i-1})^2 + (Z_i - Z_{i-1})^2)}$$

wherein L is a total length, n is the number of signals generated, X is the distance traversed by the sensors in the first direction, Z is the sensed distance.

3. An apparatus for measuring the relative differential length of a sample of a web or sheet material, the sample having a top surface and a bottom surface, the apparatus comprising:

a substantially flat surface adapted to support the sample;

air exhausting means for removing air disposed between the sample and the substantially flat surface to dispose the sample in an unrestrained state;

a plurality of non-contact sensor adapted to sense the distance from a reference plane to the sample and generate a signal representative of the distance sensed;

a translation member adapted to translate the plurality of non-contact sensors in a first direction along the length of the sample; and a data collection system for collecting the generated signals and determining a relative differential length of the sample from the generated signals.

4. The apparatus according to claim 3 further comprising an isolation member to vibrationally isolate the substantially flat surface.

* * * * *

UNITED STATES PATENT AND TRADEMARK OFFICE
CERTIFICATE OF CORRECTION

PATENT NO. : 6,178,657 B1
DATED : January 30, 2001
INVENTOR(S) : Ernest A. Graff It is certified that error appears in the above-identified patent and that said Letters Patent is hereby corrected as shown below:

<u>Title page,</u>
Item [56], References Cited, U.S. PATENT DOCUMENTS, insert the following three (3) U.S. References to the "References Cited" list:
-- U.S. 3,611,764    October 12, 1971    Asano
U.S. 5,113,358    May 12, 1992    Reber
U.S. 5,678,447    October 21, 1997    Graff --

Signed and Sealed this

Twelfth Day of November, 2002

*Attest:*

*Attesting Officer*

JAMES E. ROGAN
*Director of the United States Patent and Trademark Office*